(12) United States Patent
Lin

(10) Patent No.: US 6,865,405 B2
(45) Date of Patent: Mar. 8, 2005

(54) METHOD FOR AUTOMATICALLY ADJUSTING THE BACKGROUND BRIGHTNESS OF CELLULAR PHONE DISPLAY

(75) Inventor: Ching-Yuan Lin, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 784 days.

(21) Appl. No.: 09/912,299

(22) Filed: Jul. 26, 2001

(65) Prior Publication Data

US 2003/0022699 A1 Jan. 30, 2003

(51) Int. Cl.$^7$ .............................................. H04M 1/00
(52) U.S. Cl. ..................................... 455/566; 455/574
(58) Field of Search .............................. 455/566, 574, 455/571, 572, 159.1; 345/102, 77, 84

(56) References Cited

U.S. PATENT DOCUMENTS

| | | | | |
|---|---|---|---|---|
| 4,198,601 A | * | 4/1980 | Ono et al. ..................... | 455/73 |
| 4,348,666 A | * | 9/1982 | Ogita ........................... | 345/39 |
| 6,418,325 B1 | * | 7/2002 | Reber et al. .............. | 455/556.1 |
| 6,507,729 B1 | * | 1/2003 | Cheng ........................ | 455/90.1 |
| 2004/0029546 A1 | * | 2/2004 | Tsuchi et al. ............ | 455/159.1 |
| 2004/0140972 A1 | * | 7/2004 | Hirota et al. ................ | 345/204 |

* cited by examiner

Primary Examiner—Benny Tieu
(74) Attorney, Agent, or Firm—Bacon & Thomas PLLC

(57) ABSTRACT

A method is implemented in a cellular phone having a display, a CPU, a photosensitive element (e.g., photoresistor) on a surface, and a control circuit coupled to the photosensitive element. The method comprises the steps of switching the cellular phone to an automatic background brightness control mode; measuring a voltage between two terminals of the photosensitive element by the CPU; and adjusting a background brightness of the display with respect to the measured voltage. Accordingly, CPU may lower the background brightness of the display as the voltage decreases, while increasing the background brightness of the display as the voltage increases. This can reduce power consumption of cellular phone display in a strong light environment.

4 Claims, 1 Drawing Sheet

METHOD FOR AUTOMATICALLY ADJUSTING THE BACKGROUND BRIGHTNESS OF CELLULAR PHONE DISPLAY

FIELD OF THE INVENTION

The present invention relates to cellular phones and more particularly to a method for automatically adjusting the background brightness of a cellular phone display with respect to environmental light so as to save power.

BACKGROUND OF THE INVENTION

Cellular phones have been widely used through out the world. Further, there is no end for such booming because among other advantageous benefits as compared to conventional wire telephone, cellular phone is slim, multifunctional, inexpensive, portable, and convenient while still maintaining a high communication quality. Hence, more and more people like to use cellular phones whether for business or social purpose. But the capacity of a rechargeable battery of cellular phone is relatively small. Hence, cellular phone is off when battery is too low. As a result, a user having a disconnected cellular phone may miss important calls even the calling party can leave a message/ telephone number in a memory (e.g., voice box) of cellular phone of the called party during this off period. Hence, there is a need to provide an effective power saving method so as to increase the service time per full charge of cellular phone.

SUMMARY OF THE INVENTION

It is therefore an object of the present invention to provide a method implemented in a cellular phone having a display, a central processing unit (CPU), a photosensitive element (e.g., photoresistor) on a surface, and a control circuit coupled to the photosensitive element. The method comprises the steps of (a) switching the cellular phone to an automatic background brightness control mode; (b) measuring a voltage between two terminals of the photosensitive element by the CPU; and (c) adjusting a background brightness of the display with respect to the measured voltage. Since resistance of photosensitive element is decreased when subjected to a strong light environment, resulting in a lowering of voltage measured between two terminals of photosensitive element. To the contrary, resistance of photosensitive element is increased when subjected to a dark environment, resulting in a rising of voltage measured between two terminals of photosensitive element. Accordingly, CPU may lower the background brightness of cellular phone display as the measured voltage decreases, while increasing the background brightness of cellular phone display as the measured voltage increases. By implementing this, it is possible to significantly reduce power consumption of cellular phone display in a strong light environment.

The above and other objects, features and advantages of the present invention will become apparent from the following detailed description taken with the accompanying drawings.

DETAILED DESCRIPTION OF THE PREFERRED EMBODIMENTS

Figure 1:
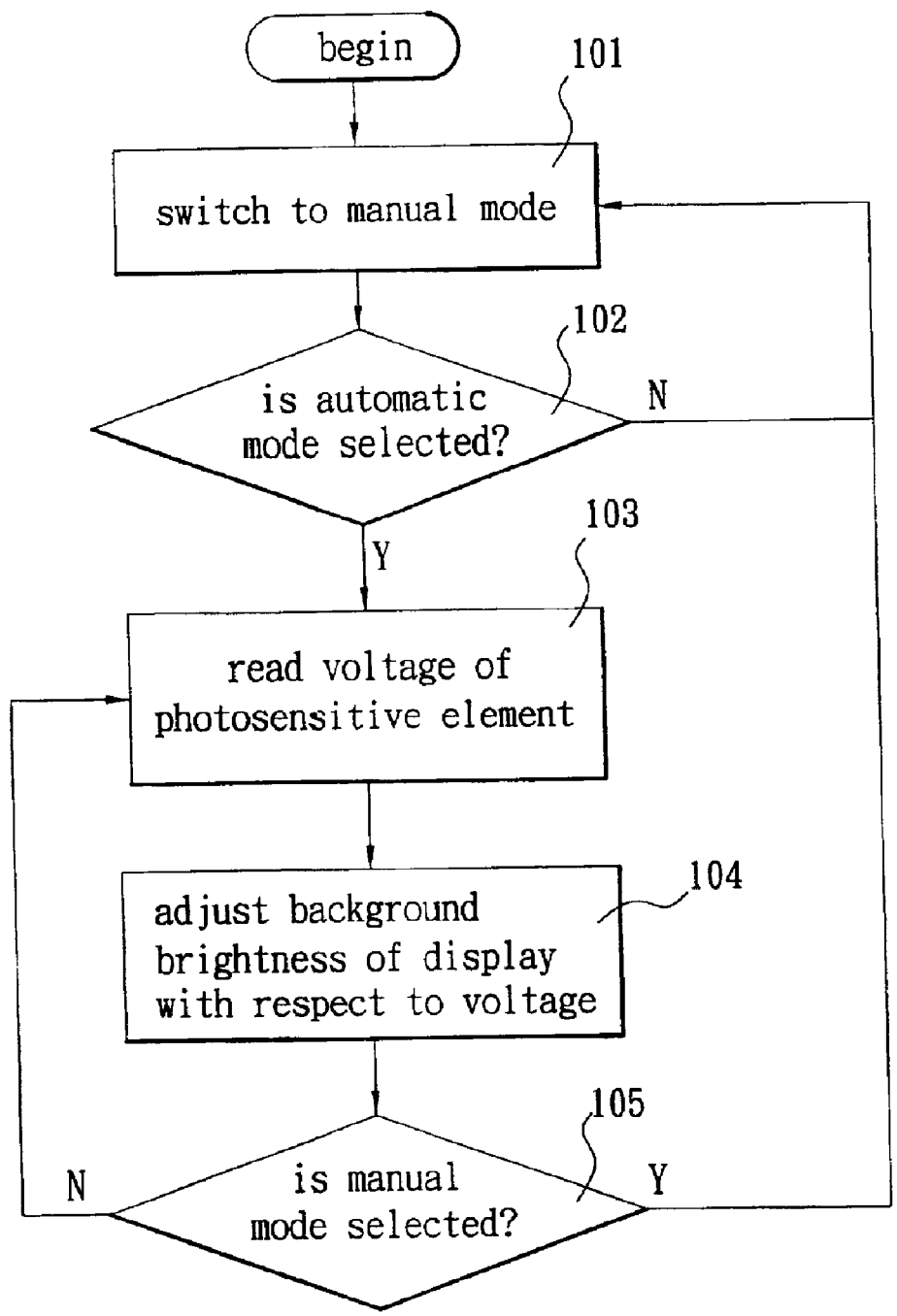
FIG. 1 is a flow chart illustrating a process for automatically adjusting the background brightness of cellular phone display according to the invention.

A method for automatically adjusting the background brightness of cellular phone display in accordance with the invention is implemented by providing a photosensitive element (e.g., photoresistor) on surface of cellular phone. Photosensitive element is coupled to a control circuit of cellular phone. Hence, when user switches cellular phone to an automatic background brightness control mode, a central processing unit (CPU) of cellular phone may measure a voltage drop between two terminals of photosensitive element. CPU then adjusts background brightness of cellular phone display with respect to the measured voltage value.

Referring to FIG. 1, as cellular phone is turned on the CPU of cellular phone may perform a process according to the invention. The process comprises the following steps: In step 101, switch cellular phone to a manual background brightness control mode so that user may select a desired background brightness from a brightness menu shown on a display of cellular phone. In step 102, determine whether an automatic background brightness control mode is selected. If yes, the process goes to step 103. If not, the process loops back to step 101. In step 103, read a voltage value measured between two terminals of photosensitive element. In step 104, adjust background brightness of cellular phone display with respect to the measured voltage value. In step 105, determine whether a manual background brightness control mode is selected. If yes, the process loops back to step 101. If not, the process loops back to step 103.

In an embodiment of the invention, resistance of photosensitive element is decreased when subjected to a strong light environment, resulting in a lowering of voltage measured between two terminals of photosensitive element. To the contrary, resistance of photosensitive element is increased when subjected to a dark environment, resulting in a rising of voltage measured between two terminals of photosensitive element. Further, voltage measured between two terminals of photosensitive element is divided into four stages. For example, a first stage is defined as voltage lower than 1.5 volt. A second stage is defined as voltage in the range between 1.5 volt and 2 volt. A third stage is defined as voltage in the range between 2 volt and 2.5 volt. A fourth stage is defined as voltage in the range between 2.5 volt and 3 volt. Correspondingly, when voltage between two terminals of photosensitive element measured by CPU is lowered than 1.5 volt (i.e., first stage), background of cellular phone display is switched to an off state automatically. Similarly, when voltage between two terminals of photosensitive element measured by CPU is in the range between 1.5 volt and 2 volt (i.e., second stage), background of cellular phone display is switched to a low brightness state automatically. When voltage between two terminals of photosensitive element measured by CPU is in the range between 2 volt and 2.5 volt (i.e., third stage), background of cellular phone display is switched to an intermediate brightness state automatically. When voltage between two terminals of photosensitive element measured by CPU is in the range between 2.5 volt and 3 volt (i.e., fourth stage), background of cellular phone display is switched to a high brightness state (i.e., maximum) automatically.

In brief, resistance of photosensitive element is decreased when subjected to a strong light environment, resulting in a lowering of voltage measured between two terminals of photosensitive element. To the contrary, resistance of photosensitive element is increased when subjected to a dark environment, resulting in a rising of voltage measured between two terminals of photosensitive element. Accordingly, CPU may lower the background brightness of cellular phone display as the measured voltage decreases, while increasing the background brightness of cellular phone display as the measured voltage increases. By implementing this, it is possible to significantly reduce power consumption of cellular phone display in a strong light environment While the invention has been described by means of specific embodiments, numerous modifications and variations could be made thereto by those skilled in the art without departing from the scope and spirit of the invention set forth in the claims.

What is claimed is:

1. In a cellular phone having a display, a central processing unit (CPU), a photosensitive element on a surface, and a control circuit coupled to said photosensitive element, a method comprising the steps of:

(a) switching said cellular phone to an automatic background brightness control mode;

(b) measuring a voltage between two terminals of said photosensitive element by said CPU; and (c) adjusting a background brightness of said display with respect to said measured voltage.

2. The method of claim 1, further comprising the steps of:

(d) determining whether a manual background brightness control mode is selected; and (e) if result in step (d) is positive switching said cellular phone to said manual background brightness control mode for commanding said CPU to select and show said background brightness from a brightness menu shown on said display.

3. The method of claim 1, wherein said photosensitive element is a photoresistor.

4. The method of claim 1, wherein said voltage measured in step (b) is one of first stage when said voltage is lower than 1.5 volt, second stage when said voltage is in the range between 1.5 volt and 2 volt, third stage when said voltage is in the range between 2 volt and 2.5 volt, and fourth stage when said voltage is in the range between 2.5 volt and 3 volt, whereby said CPU is capable of switching said background of said display to one of off, low brightness, intermediate brightness, and high brightness states with respect to said corresponding voltage.

* * * * *